United States Patent
Petricek

(10) Patent No.: US 7,259,473 B2
(45) Date of Patent: Aug. 21, 2007

(54) METHOD OF CONTROLLING PARALLEL DIVERSE CONVERSION PATHS IN DC-TO-DC POWER CONVERTER

(75) Inventor: Shea Lynn Petricek, Round Rock, TX (US)

(73) Assignee: Intersil Americas Inc., Milpitas, CA (US)

( * ) Notice: Subject to any disclaimer, the term of this patent is extended or adjusted under 35 U.S.C. 154(b) by 537 days.

(21) Appl. No.: 10/831,846

(22) Filed: Apr. 26, 2004

(65) Prior Publication Data

US 2005/0179324 A1   Aug. 18, 2005

Related U.S. Application Data

(60) Provisional application No. 60/545,368, filed on Feb. 18, 2004.

(51) Int. Cl.
*H02J 3/38* (2006.01)
*H02J 3/00* (2006.01)
*G05F 1/00* (2006.01)

(52) U.S. Cl. .................... 307/44; 307/82; 323/272
(58) Field of Classification Search ............... 307/44, 307/82; 323/272
See application file for complete search history.

(56) References Cited

U.S. PATENT DOCUMENTS

| | | | |
|---|---|---|---|
| 6,381,155 B1 * | 4/2002 | Kadatsky et al. | 363/65 |
| 6,605,931 B2 * | 8/2003 | Brooks | 323/272 |
| 6,822,426 B1 * | 11/2004 | Todd et al. | 323/275 |
| 6,995,548 B2 * | 2/2006 | Walters et al. | 323/272 |

* cited by examiner

*Primary Examiner*—Michael Sherry
*Assistant Examiner*—Michael Rutland-Wallis
(74) *Attorney, Agent, or Firm*—Akerman Senterfitt; Neil R. Jetter

(57) ABSTRACT

A DC-DC converter has a plurality of diverse type DC-DC converter channels whose outputs are combined to provide a composite DC power output to a load. One of the channels is a high efficiency power path that supplies the average current demand of the load. A second channel comprises a fast transient response power path which handles transient response demands.

13 Claims, 1 Drawing Sheet

METHOD OF CONTROLLING PARALLEL DIVERSE CONVERSION PATHS IN DC-TO-DC POWER CONVERTER

CROSS-REFERENCE TO RELATED APPLICATION

The present application claims the benefit of previously filed, now abandoned Application Ser. No. 60/545,368, filed Feb. 18, 2004 by S. Petricek, entitled: "Method of Controlling Multiple Parallel Conversion Paths," assigned to the assignee of the present application, and the disclosure of which is incorporated herein.

FIELD OF THE INVENTION

The present invention relates in general to DC power supply systems and subsystems therefor, and is particularly directed to a new and improved DC-DC converter architecture, in which respectively different channels thereof have different operational performance parameters, in particular a fast transient response power path and a high efficiency power path, whose operations are controlled so as to optimize the overall performance of the converter.

BACKGROUND OF THE INVENTION

The design of a DC-DC converter often involves a compromise between goals of bandwidth capability and efficiency. On the one hand, it is desired to provide a fast response capability to load transients, which may require a switching frequency higher than that normally required for steady state loading. A problem arises since increasing the switching frequency to achieve more gain and fast response times involves a trade-off of efficiency, as switching losses increase substantially.

SUMMARY OF THE INVENTION

In accordance with the present invention, this trade-off problem is successfully addressed by employing a dual mode DC-DC converter architecture, that includes a fast transient response power path for handling rapid changes in load current demand, and a high efficiency power path which is configured to provide average power supply requirements once the load transient demand has subsided. The fast transient response power path is of conventional DC-DC converter configuration that includes a voltage regulation control unit, that is referenced to a prescribed DC voltage and which controls the operation of a PWM modulator and power switching unit such as a standard buck mode configured converter, the output of which is coupled to a load. As a non-limiting, but preferred example, the power switching circuitry comprises a multiphase output configuration, in which currents supplied through multiple output inductors are summed for delivery to the load. In accordance with conventional operation, the regulation control unit of the fast response power path monitors the voltage at the output node via a feedback path and is operative to vary its output current in accordance with the transient demand exhibited by the load.

Coupled in parallel with the fast transient response power path is the high efficiency power path, which supplies an average state current to the output node. A current sensing circuit, such as, but not limited to a current-to-voltage conversion unit, is coupled in the output current path from output node of the fast transient response power path. This current-sensing circuit supplies a voltage representative of the current being supplied by the high bandwidth path to an integrating difference amplifier, which is referenced to a prescribed reference voltage associated with a reference current.

The output of the integrating error amplifier is a voltage control input to a current error amplifier that is used to drive the PWM and power switching circuitry within the high efficiency power path. Like the fast transient response power path, the high efficiency power path DC-DC converter is of conventional configuration having a PWM modulator and power switching unit, such as a standard buck mode configured converter. For purposes of providing a non-limiting example, the power switching circuitry may also be understood to have a multiphase output configuration, in which currents supplied through multiple output inductors are summed as an output current to be combined with that supplied by the high bandwidth power path for delivery to the load. A current-to-voltage converter is coupled to the output node in the current flow path for the average current, and provides a voltage that is fed back to the current error amplifier.

In operation, the two paths perform respectively different functions, as described briefly above. Via an output voltage monitoring path the fast transient response power path directly monitors the output node for a change in load conditions and responds in kind with a rapid change in its output current. In effect, this path monitors 'edges' in the output current demand. On the other, the high efficiency power path has no knowledge of the output load voltage; it only has knowledge of the current supplied by the high frequency path. This current is integrated through the front end error amplifier circuitry of the high efficiency power path to produce an average output current which is summed with the transient response current to realize a composite current delivered to the load.

In this manner the (wide bandwidth) fast transient response power path is effective to completely control voltage regulation, as it alone directly monitors output voltage. In a complementary manner, the high efficiency power path is controlled in such a way as to relieve the fast transient response power path, so that the average current is carried by the high efficiency power path which integrates the output current being delivered by the high bandwidth path in response to a transient change. Once the transient subsides, the load is supplied with the average current being generated by the high efficiency path. In this manner, over the integration period of the front end error amplifiers of the high efficiency path, the high bandwidth path will have been relieved of having to supply all the DC current, as when it first reacted to a change in load requirements.

DETAILED DESCRIPTION

Figure 1:
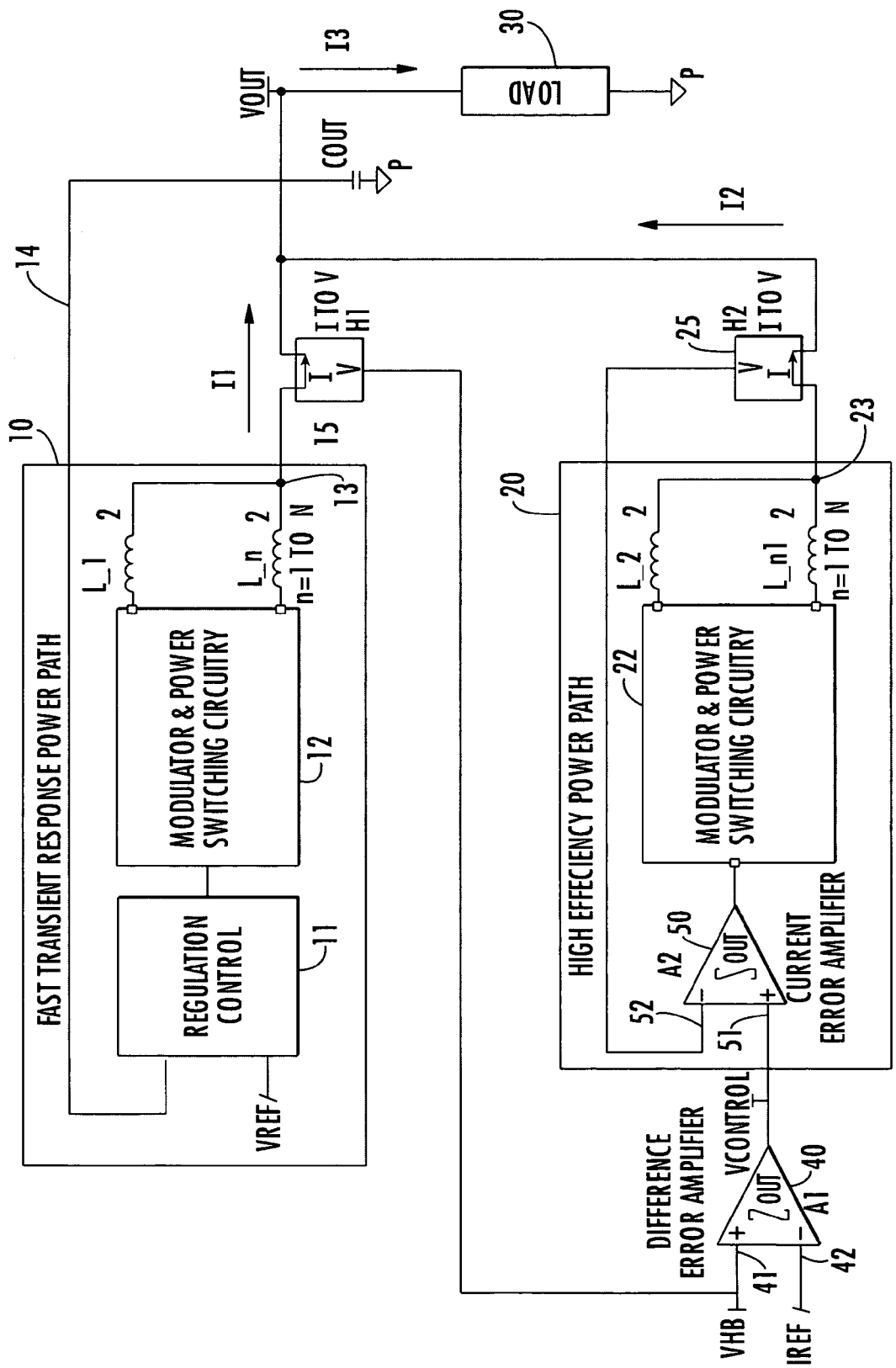
FIG. 1 is an overall block diagram of a parallel diverse channel DC-DC converter system in accordance with the present invention.

Before describing the diverse channel DC-DC converter in accordance with the present invention, it should be observed that the invention resides primarily in a modular arrangement of conventional power supply circuits and electronic signal processing circuits and components therefor. In a practical implementation that facilitates packaging in a hardware-efficient equipment configuration, these modular arrangements may be readily implemented as field programmable gate array (FPGA)-, or application specific integrated circuit (ASIC)-based chip sets. Consequently, the configuration of such an arrangement of circuits and components and the manner in which they are interfaced with one another have, for the most part, been illustrated in the drawings by readily understandable block diagrams, which show only those specific details that are pertinent to the present invention, so as not to obscure the disclosure with details which will be readily apparent to those skilled in the art having the benefit of the description herein. The block diagram illustrations are primarily intended to show the major components of the invention in a convenient functional grouping, whereby the present invention may be more readily understood.

Attention is initially directed to FIG. 1, which is an overall block diagram of a parallel diverse channel DC-DC converter system in accordance with the present invention. As shown therein, the converter includes a fast transient response power path 10, that is designed to respond rapidly to transients in load current demand, and a high efficiency power path 20, which is designed to handle average current demand of an output load 30.

The fast transient response power path 10 is of conventional DC-DC converter configuration having a regulation control unit 11, referenced to a prescribed voltage $V_{REF}$ that controls the operation of a PWM modulator and power switching unit 12, such as a standard buck mode configured converter. It should be noted that although this is shown as a voltage mode control circuit, it could also be implemented as a current mode control circuit without a loss in generality.

For purposes of providing a non-limiting example, the power switching circuitry is shown as having a multiphase output configuration, in which currents supplied through output inductors L1-1, . . . , L1-n are summed as an output current I1 at an output node 13 for delivery to load 30 which is coupled to output power terminal VOUT. In accordance with conventional operation, the regulation control unit of the fast response power path monitors the voltage at the output node VOUT via a feedback path 14, and is operative to vary the current I1 in accordance with the demand exhibited by the variation in output voltage at the VOUT terminal.

Coupled in parallel with the fast transient response power path is the high efficiency power path, which supplies an average state current I2 to the output node VOUT. For this purpose, a current-to-voltage conversion unit 15 is coupled in the output current path from output node 13 of the fast transient response power path 10. Current-to-voltage conversion unit 15 supplies a voltage representative of the current I1 to a first, non-inverting (+) input 41 of an integrating difference amplifier 40, the inverting (−) input 42 of which is coupled to receive a prescribed reference voltage associated with a reference current (e.g., 0 amps).

The output 43 of integrating error amplifier 40 is a voltage control input VControl to the non-inverting (+) input 51 of a current error amplifier 50. Amplifier 50 is used to drive the PWM and power switching circuitry 22 within the high efficiency power path 20. Like the fast transient response power path 10, the high efficiency power path DC-DC converter is of conventional configuration having a PWM modulator and power switching unit 22, such as a standard buck mode configured converter. For purposes of providing a non-limiting example, the power switching circuitry 22 is also shown as having a multiphase output configuration, in which currents supplied through output inductors L2-1, . . . , L2-n are summed as an output current I2 at an output node 23 for delivery to load 30 at output power terminal VOUT. A current-to-voltage converter 25 is coupled to output node 23 in the current flow path for current I2, and provides a voltage representative of the current I2. This voltage is fed back to the inverting (−) input 52 of current error amplifier 50. (It will be appreciated that amplifier 50 and the current to voltage for the high efficiency stage effectively form a current mode controlled buck converter wherein the 'reference' is Vcontrol, as a non-limiting example.)

In operation, the two paths 10 and 20 perform respectively different functions, as described briefly above. Via feedback path 14, the fast transient response power path 10 directly monitors the output node for a change in load conditions and responds in kind with a rapid change in output current I1. In effect, this path monitors 'edges' in the output current demand. On the other, the high efficiency power path 20 has no knowledge of the output load voltage; it only has knowledge of the current I1 flowing in the high frequency path. This current is integrated through the front end circuitry of the high efficiency power path 20 to produce an average output current I2, which is summed with the transient response current I1 to realize a composite current I3 delivered to the load 30.

In this manner the (wide bandwidth) fast transient response power path 10 is effective to completely control voltage regulation, as it alone directly monitors load current demand. In a complementary manner, the high efficiency power path 20 is controlled in such a way as to relieve the fast transient response power path 10 of the load, so that the average current is carried by the high efficiency power path 20, which integrates the output current being delivered by the high bandwidth path in response to a transient change. Once the transient subsides, the load is supplied with the average current being generated by the high efficiency path 20. In this manner, over the integration period of the front end error amplifiers of the high efficiency path 20, the high bandwidth path 10 will have been relieved of having to supply all the DC current, as when it first reacted to a change in load requirements.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. A DC-DC converter comprising:
   a plurality of DC-DC converter channels having outputs thereof combined at an output (VOUT) to provide a composite DC power output to a load, and
   wherein one of said channels comprises a fast transient response power path, said fast transient response power path having voltage feedback from VOUT to its input and a first current sensing circuit in its output current path for sensing output current provided by said fast transient response power path and
   another of said channels comprises a high efficiency power path, said high efficiency power path having a difference amplifier coupled to its input,
   wherein said high efficiency power path does not include any voltage feedback from said VOUT to its input; and
   wherein an output of said first current sensing circuit is coupled to one input of said difference amplifier, the other input of said difference amplifier referenced to a reference level associated with a reference current.

2. The DC-DC converter according to claim 1, wherein said first current sensing circuit of said fast transient response power path comprises a first current-to-voltage converter, and wherein said reference level associated with said reference current comprises a reference voltage.

3. The DC-DC converter according to claim 2, wherein said high efficiency power path includes a second current-to-voltage converter coupled in an output current path therefrom to said load, and a current error amplifier which is operative to control the operation of said high efficiency power path in accordance with the outputs of said first and second current-to-voltage converters.

4. The DC-DC converter according to claim 1, wherein said plurality of DC-DC converter channel comprises multi-phase DC-DC converter channels.

5. A method of supplying DC power to an output load comprising the steps of:
(a) providing a first DC-DC converter channel having a fast transient response power path;
(b) providing a second DC-DC converter channel having a high efficiency power path;
(c) combining current outputs of said fast and second DC-DC converter channels to provide a composite DC power output (VOUT) to a load,
(d) feeding back a signal associated with output current supplied by said fast transient response power path,
(e) controlling operation of said high efficiency power path using said signal associated with said output current supplied to said fast transient response power path; and
wherein said fast transient response power path includes voltage feedback from VOUT to its input, and said high efficiency power path does not include voltage feedback from said VOUT to its input.

6. The method according to claim 5, further comprising the step of converting said output current supplied by said fast transient response power path using a first current-to-voltage converter, and wherein said high efficiency power path is operative to integrate the output of said current-to-voltage converter to produce an average current demanded by said load.

7. The method according to claim 6, wherein said high efficiency power path includes a second current-to-voltage converter coupled in an output current path therefrom to said load, and a current error amplifier which is operative to control the operation of said high efficiency power path in accordance with the outputs of said first and second current-to-voltage converters.

8. The method according to claim 5, wherein said plurality of DC-DC converter channels comprise multi-phase DC-DC converter channels.

9. A method of supplying DC power to an output load comprising the steps of:
(a) providing a plurality of DC-DC convener channels having outputs thereof combined at an output (VOUT) to provide a composite DC power output to a load, said plurality of channels comprising a first DC-DC converter channel having a fast response voltage regulation path and a feedback loop to monitor (VOUT) for rapidly supplying output current responsive to a change in said load to ensure voltage regulation and a second DC-DC converter channel having a high efficiency voltage regulation path, wherein said high efficiency voltage regulation path does not include voltage feedback from said VOUT to its input;
(b) feeding back a feedback signal representative of said rapidly supplied output current to an input of said a second DC-DC converter channel, and
(c) controlling said second DC-DC convener channel based on said feedback signal to supply an average current to said load.

10. The method according to claim 9, wherein said fast transient response power path is operative to monitor current demand of said load.

11. The method according to claim 10, wherein said fast transient response power path includes a first current-to-voltage convener coupled in an output current path to said load, and wherein high efficiency power path is operative to integrate the output of said current-to-voltage convener to produce said average current.

12. The method according to claim 11, wherein said high efficiency power path includes a second current-to-voltage converter coupled in an output current path therefrom to said load, and a current error amplifier which is operative to control the operation of said high efficiency power path in accordance with the outputs of said first and second current-to-voltage converters.

13. The method according to claim 9, wherein said plurality of DC-DC convener channels comprise multi-phase DC-DC converter channels.

* * * * *